Nov. 19, 1968   G. L. KELLY   3,411,623
INSPECTION APPARATUS
Filed April 3, 1967   2 Sheets-Sheet 1

INVENTOR.
G. L. KELLY
BY
Young, Lugg
ATTORNEYS

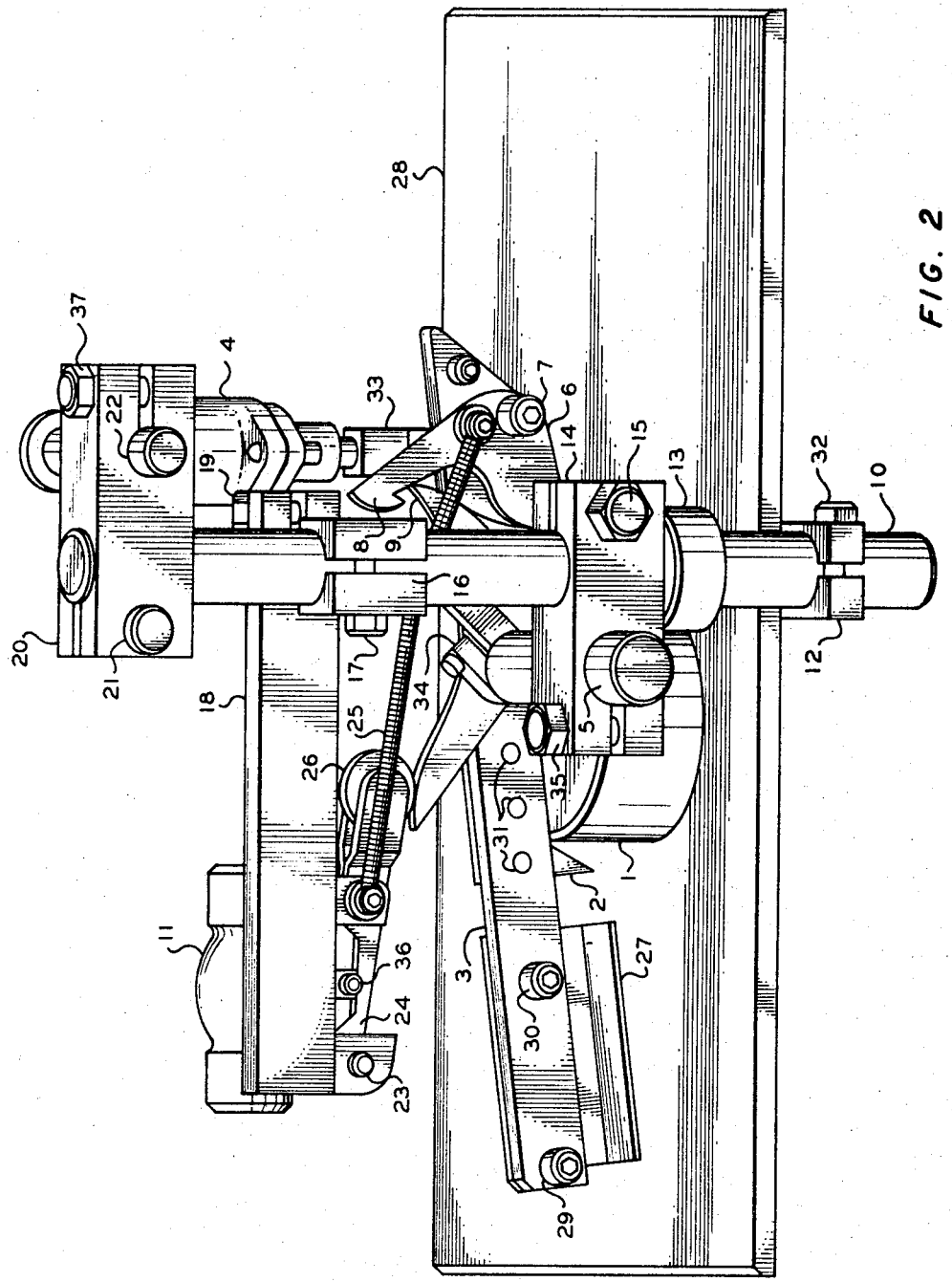

United States Patent Office 3,411,623
Patented Nov. 19, 1968

3,411,623
INSPECTION APPARATUS
Guy L. Kelly, Kansas City, Kans., assignor to Phillips Petroleum Company, a corporation of Delaware
Filed Apr. 3, 1967, Ser. No. 627,936
10 Claims. (Cl. 209—80)

ABSTRACT OF THE DISCLOSURE

An inspection apparatus for ring shaped objects comprising (a) lever means having a stop at one end for blocking movement of an object along a path, (b) means for moving the stop into, and out of, the path of the object, (c) means for actuating an ejecting device for ejecting an object not passing inspection, and (d) biased means connected to the other end of said lever means and so positioned that it actuates said ejection device when an improperly shaped object is being inspected.

Figure 3:
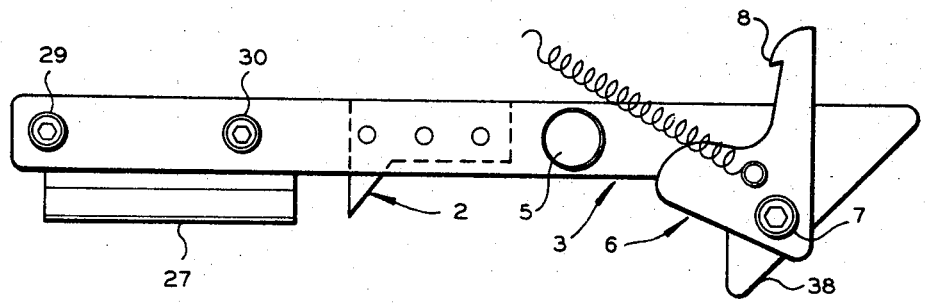

This invention relates to an apparatus for inspecting objects, and for rejecting improperly shaped objects.

In one aspect, the invention relates to an inspection apparatus which includes means including a fixed stop for blocking movement of an object along a path, means connected thereto for moving the fixed stop into and out of the path of the object, means for actuating a device for rejecting a blocked object from the path, and biased, movable means connected to the blocking means at a sufficient distance from the fixed stop so that when an improperly shaped object is between the fixed stop and the biased, movable means actuates means for rejecting the object and, when a properly shaped object is inspected, the biased, movable means contacts the surface of the object and revolves a sufficient distance in circular path preventing actuation of the rejection device and permitting the fixed stop to move from the path of the object unblocking movement along a fixed path and out of the inspection apparatus.

In a specific aspect, the invention relates to an inspection apparatus which comprises a pivoted arm having a fixed stop at one end for blocking movement of an object along a path, means for moving the stop into and out of the path of the object comprising an air cylinder with its shaft connected to the pivoted arm, lever means for actuating the trigger of an air cylinder which releases an air blast for rejecting an improperly shaped object from the path, and a biased, movable stop pivoted on the arm at a sufficient distance from the fixed stop so that the pivoted stop operates lever means when an improperly shaped object is between the fixed stop and the pivoted stop and, when a properly shaped object is between them, the pivoted stop contacts the surface of the object and moves a sufficient distance to prevent operation of the lever means and causing the fixed stop to move out of the path of the object allowing continued movement of the object on a fixed path.

Devices for inspecting objects such as component parts used in a manufacturing process, and a reliable method for rejecting improperly shaped objects, has long been a problem.

It is an object of this invention to provide an inspection apparatus which rapidly and reliably tests the shape of an object. Another object is to provide an apparatus which consistently rejects improperly shaped articles, particularly those fed as a component to a manufacturing process. A specific object is to provide an apparatus suitable for quickly and reliably inspecting cylindrical shaped rings and for consistently rejecting twisted and flattened rings.

Other aspects, objects and advantages of this invention are apparent from the disclosure, claims and drawings.

Broadly, the inspection apparatus of this invention comprises (a) lever means including a fixed stop for blocking movement of an object along a path; (b) movable reciprocating means connected to (a) for moving the fixed stop into, and out of, the path of the object; (c) means for actuating a device for rejecting a blocked object from the path; and (d) biased movable means connected to (a) at a sufficient distance from said fixed stop so that said biased, movable means operates (c) when an improperly shaped object is between said fixed stop and (d); when a properly shaped object is between said fixed stop and (d), (d) contacts the surface of the object, and moves a sufficient distance to prevent operating (c).

Figure 1:
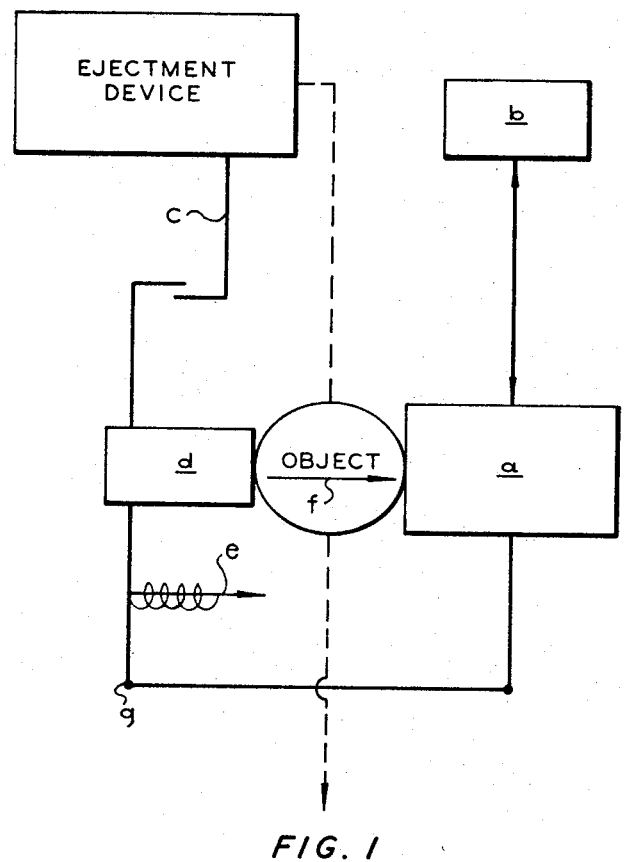

The drawings provide a better understanding of the apparatus of this invention, and of the functional relationship of its elements. FIGURE 1 illustrates the invention in schematic form. FIGURE 2 illustrates a working embodiment of the invention in the presently preferred form. FIGURE 3 shows a portion of the device illustrated in FIGURE 2.

Referring to the drawings, FIGURE 1 shows a schematic representation of the apparatus of this invention. The letters used therein are taken from the statement of invention. The drawing shows lever means including a fixed stop (a) for blocking movement of the object in the direction indicated by arrow (f). Reciprocating means (b) is connected to (a) and moves the fixed stop attached to (a) into, and out of, the path of the object. Means (c) serves to actuate the ejection device, which ejects an improperly shaped object from its path of movement. Biased, movable means (d), which is shown pivoted about point (g), is connected to (a) at a sufficient distance from the fixed stop so that biased, movable means (d) operates actuating means (c) when an improperly shaped object is between the fixed stop and (d). When a properly shaped object is between the fixed stop and (d), (d) contacts the surface of the object and moves a sufficient distance (against bias (e)) to prevent operation of ejection means (c) and allowing (a) to unblock the movement of the object along the path (f). The dotted line represents the path of movement of an ejected object.

Now referring to FIGURES 2 and 3, post 10 supports the inspection apparatus, and is mounted on inspection plate 28 adjacent to conveying means (not shown) by clamp 12 and bolt 32. Fixed collar 13 mounted on post 10 abuts clamp 14 to serve as a stop for proper height adjustment of post 5 above inspection plate 28. Means (a) is shown as pivoted arm 3 having fixed stop 2 attached thereto. In the position shown, fixed stop 2 blocks the movement of cylindrical object 1 moving by conveying means (not shown) from right to left. Arm 3 is pivoted about shaft 5, which is mounted on post 10 by means of clamp 14 and bolts 15 and 35. The position of fixed stop 2 can be adjusted by bolting the stop to any of the holes marked 31. Thus, the distance between fixed stop 2 and pivoted stop 6 can be adjusted, depending upon the shape and dimensions of the object inspected.

Means (b) consists of a first air cylinder 4 and air cylinder shaft 33 which is bolted to arm 3. Cylinder 4 is mounted on shaft 22, and clamped by bolt 37 to bracket 20 which is bolted to post 10 by means of bolt 21.

Means (c) consists of Y-shaped lever 9 which is pivotally mounted on shaft 5. Adjustable stop 34 is mounted on shaft 5 with a horizontal member extending over one arm of lever 9 and is adjusted so that lever 9 can be contacted by hook 8. As one arm of lever 9 moves downward, the other side moves upward against roller 26 on pivoted arm 24. The arm moves upward about pivot 23, actuating trigger 36 in releasing a blast of air from a second air cylinder 11. The blast of air from cylinder 11 is directed by tubing means (not shown) against the ring and pushes the ring out of its path of movement. Air cylinder 11, arm 24, roller 26, and pivot 23 are mounted on fixed arm 18, which is held by bolt 19 to clamp 16, which is fastened to post 10 by bolt 17.

Biased, movable means (d), consisting of stop 6 pivoted on arm 3 by bolt 7, is baised by spring 25.

The pivoted arm shown in FIGURE 2 operates as follows. The cylindrical object 1, moving from right to left, is blocked by fixed stop 2. Periodically, air cylinder 4 is actuated by means not shown, moving shaft 33 and pivoted stop 6 downward. When a properly shaped object is between fixed stop 2 and biased, pivoted stop 6, continued downward movement of shaft 33 brings pivoted stop 6 into contact with the surface of a properly shaped object, an integral hook 8 moves in a circular arc around pivot 7 against the bias of spring 25 a distance sufficient to prevent operating lever 9. Simultaneously, the front end of arm 3 carrying stop 2 rises sufficiently far to permit the properly shaped object to move to the left by conveying means beyond stop 2 to the next station in the manufacturing process. As arm 3 raises stop 2 above the object, primary stop 38 is lowered sufficiently to contact the inside surface of the next incoming object preventing entry to the apparatus until stop 2 is in the lowered position. After the inspected object has passed stop 2, the front end of pivoted arm 3 moves downward, and pivoted stop 6 returns to normal biased position, primary stop 38 has raised sufficiently to permit entry of an incoming object, and the cycle is repeated.

When an improperly shaped article is blocked by fixed stop 2, pivoted stop 6 does not contact the surface of the object during downward movement of arm 3, and integral hook 8 engages and operates lever 9, which pushes arm 24 and trigger 36 upward. Upward movement of trigger 36 actuates air cylinder 11, which releases a blast of air through a tube (not shown) against the improperly shaped article, ejecting it from its path.

Means 27, which is an extension of arm 3, is joined thereto by bolts 29 and 30. If jam-ups of objects occur downstream of the inspection apparatus, an object will become lodged under extension 27 causing primary stop 38 to contact the inside surface of an incoming object and prevent further movement until the jammed object clears extension 27 during the next cycle of cylinder 4. Thus, jam-ups of objects downstream of the apparatus of the invention will not result in jamming of the apparatus itself.

Those skilled in the art will recognize that, once the distance between fixed stop 2 and pivoted stop 6 is determined for a given object, each object to be tested must be guided between the stops so that the apparatus of the invention tests the same dimension of each object. Suitable guiding means such as railings can be provided to insure proper indexing of an object to be tested between the fixed and movable stops. That is, because contact between the surface of an object blocked by fixed stop 2 and pivoted stop 6 is necessary to prevent actuation of the ejectment device, each object to be tested must be inspected across the same dimension. An object of any shape and dimension can be tested by the apparatus of this invention, including cylinders, cubes, rectangular parallelepipeds, etc.

The following example describes the working embodiment of the invention, and illustrates its efficiency.

*Example*

In the manufacture of closures for food containers, it is necessary to assemble round paper rings and discs. The assembly operation is performed properly when the rings are circles, without any portion being flattened or crushed. Inspection of the rings is essential.

Paper rings, 3¾" diameter x ¾" high, are conveyed consecutively from storage en route to the assembly machine via the inspection device. A ring that has been crushed laterally so that it has a minor diameter of 3¼" and a major diameter of 4¼" comes to rest against the fixed stop of the inspection device. In either instance of the major or minor diameters being coincident with the line of travel, the downward movement of the movable stop and trigger will fail to contact the ring and will trigger the air ejetcion device to remove the ring from the path of travel to the assembly machine. A properly shaped ring of 3¾" diameter will contact the trigger on the movable stop and continue the normal path of travel as the fixed stop moves out of the desired path.

Reasonable modification and variation are possible within the scope of the invention, the essence of which is an apparatus for inspecting objects which comprises means including a fixed stop for blocking movement of an object along a path, means connected thereto for moving the fixed stop into and out of the path of the object, means for actuating a device for ejecting a blocked object from the path, and biased, movable means connected to the blocking means at a sufficient distance from the fixed stop so that, the biased, movable means operates the means for actuating the ejecting device when an improperly shaped object is between the fixed stop and the biased, movable means; when a properly shaped object is between the fixed stop and the biased, movable means, the biased, movable means contacts the surface of the object and moves a sufficient distance to prevent operation of the ejection device actuating means and causing the fixed stop to move out of the path of the object and allowing the object to move along a fixed path and away from the apparatus.

I claim:
1. An inspection apparatus comprising, in combination, a lever means having a fixed stop for blocking movement of an object along a path;
  means to move said fixed stop into, and out of, the path of said object, said lever having a primary stop for permitting singular entry of objects into said inspection apparatus;
  means for actuating a device for ejecting a blocked object from said path; and
  a biased, movable means connected to said lever means at a sufficient distance from said fixed stop so that said biased, movable means operates an ejection device when an improperly shaped object is between said fixed stop and the biased, movable means, and when a properly shaped object is between said fixed stop and biased, movable means, the biased, movable means contacts the surface of the object, and moves a sufficient distance to prevent operation of the ejection means and permits additional movement of lever means to move said fixed stop from the path of the object and allowing said object to move out of the apparatus.

2. The apparatus of claim 1 wherein the lever means is a pivoted arm.

3. The apparatus of claim 2 wherein the means to move the fixed stop comprises a first air cylinder and a shaft driven by said cylinder, said shaft being connected to said pivoted arm.

4. The apparatus of claim 3 wherein the device for ejection comprises a lever means, and said device comprises a second air cylinder having a trigger, said lever means actuating said trigger when said biased, movable means operates said lever means.

5. The apparatus of claim 4 wherein said biased, movable means comprises a stop pivoted on said arm, said pivoted stop having an integral hook oriented to operate said lever means.

6. The apparatus of claim 5 wherein said pivoted arm further has means in front of said fixed stop for preventing operation of inspection apparatus when downstream jam-ups occur.

7. The apparatus of claim 2 wherein said fixed stop moves downward to move into the path of said object, and moves upward to move out of the path of said object.

8. The apparatus of claim 7 wherein said biased, movable means comprises a stop pivoted on said arm, said pivoted stop having an integral hook oriented to operate said lever means, said pivoted stop moving upward as said fixed stop moves downward, and downward as said fixed stop moves upward.

9. The apparatus of claim 8 wherein said object is cylindrical in shape, and said fixed stop and said pivoted stop are separated a sufficient distance to inspect the cylindrically shaped object across its diameter.

10. The apparatus of claim 2 wherein said primary stop moves into the path of an incoming object as said fixed stop moves upward, and moves upward out of the path of said incoming object as fixed stop moves downward into the path of said incoming object.

References Cited

UNITED STATES PATENTS

| 2,383,339 | 8/1945 | Petersen | 209—88 |
| 3,099,882 | 8/1963 | Gates | 209—88 X |

ALLEN N. KNOWLES, *Primary Examiner.*